Patented Nov. 14, 1939

2,180,281

UNITED STATES PATENT OFFICE 2,180,281

CELLULOSIC ESTER COMPOSITION

Lucas P. Kyrides, Webster Groves, Mo., assignor to Monsanto Chemical Company, St. Louis, Mo., a corporation of Delaware No Drawing. Application June 1, 1937, Serial No. 145,809

3 Claims. (Cl. 106—37)

This invention relates to cellulose ester plastics such as cellulose acetate, cellulose nitrate and the like, which are to be used as films, threads, coating compositions, molding compositions, etc. The present application is a continuation-in-part of my copending application Serial Number 725,319, filed May 12, 1934.

The present invention makes possible a new class of modifying agents for cellulose esters and ethers which alone, as well as in combination with known plasticizers, such as the phthalate esters, phosphate esters and the like, enable one to obtain results and to develop properties in a final product to an extent which has not been possible heretofore.

The object of the present invention is to provide a class of modifying agents which are compatible with the cellulose ester and which therefore fall within the broad classification of high boiling solvents or plasticizers in the sense that this expression is used in the arts, but which differs in that unlike such present day plasticizers as dibutyl phthalate, tricresyl phosphate, etc., they impart hardness and inordinate water resistance to the ultimate product, as well as smoothness thereto, to a degree not obtainable by the present day plasticizers.

I have found that the cyclohexyl aromatic sulfonamides such as N-cyclohexyl paratoluenesulfonamide, N-cyclohexyl orthotoluenesulfonamide, mixtures of the aforedesignated ortho and para isomers, N-cyclohexyl benzene or xylene sulfonamide impart the aforedesignated desirable effects when incorporated in cellulose esters. In lieu of the unsubstituted cyclohexyl group one may employ the mono or di methyl substituted cyclohexyl group. The aforementioned amides are insoluble in water, soluble in lacquer solvents and thinners and in vegetable oils. They are not hydrolyzed by water and show no appreciable hydrolysis in aqueous caustic soda when agitated therewith at 80° C. for 20 minutes. They have a good retentivity in both cellulose acetate and cellulose nitrate, although the retentivity in the nitrate ester is appreciably greater than in the acetate ester. Although these materials show an appreciable plasticizing action by themselves, they do not develop a softness of film characteristic of plasticizers of the phthalate ester and phosphate ester type, and it is desirable under some circumstances, where flexibility is required, to utilize the same with liquid plasticizers such as tricresyl phosphate, dibutyl phthalate, dimethyl phthalate, or the glycolyl phthalate ester type plasticizers.

It is to be understood that the compounds of the present invention are the monocyclohexyl derivatives of the aromatic sulfonamides and do not contemplate the di substituted derivatives which are distinctly less compatible and otherwise inferior to the compounds of the present invention. This is illustrated by the following table showing the results obtained with respect to compounds contemplated by my invention, as contrasted to the di substituted compounds of the prior art. For the purpose of this comparison cellulose acetate was dissolved in acetone and the stated amount of the aromatic sulfonamide was added, the film of the resulting mixture were then formed in the usual manner, examined and compared.

| Test material | Quantity in percent based on acetate | Remarks |
|---|---|---|
| N-cyclohexylparatoluene sulfonamide (M. P. 86° C.). | 25 | Film—clear, moderately tough. |
| N-cyclohexylparatoluene sulfonamide (M. P. 86° C.). | 50 | Film—clear, fairly tough. |
| N-cyclohexyl benzene sulfonamide (M. P. 91° C.). | 25 | Film—clear, moderately tough. |
| N-cyclohexyl benzene sulfonamide (M. P. 91° C.). | 50 | Film—slightly foggy in one part. |
| N-cyclohexyl 3,4 dichlorobenzene sulfonamide (M. P. 110° C.). | 25 | Film—clear, tough. |
| N-cyclohexyl 3,4 dichlorobenzene sulfonamide (M. P. 110° C.). | 50 | Film—slightly foggy in one part. Very slight incompatibility. |
| N-N cyclohexyl amyl-paratoluene sulfonamide (liquid). | 25 | Film—foggy separation. |
| N-N dicyclohexyl toluene sulfonamide. | 10 | Film—separation. |

All of the test materials were prepared by the same general method, that is, by reacting the corresponding aromatic sulfonchloride with cyclohexylamine. In the case of the last two products the corresponding cyclohexylamine derivatives were used. It is an interesting fact that the cyclohexyl aromatic sulfonamide composition, the use of which is contemplated by my invention, improves the flexibility of films containing known plasticizers without imparting the untoward softening effect that results from the use of present day plasticizers. So far as I am aware, this characteristic is peculiar to the compounds described herein.

Although the principles of the invention may be applied in widely varied forms and embodiments, as is well understood by those skilled in the plastic arts, the following examples illustrate specific embodiments:

*Example I.*—Cellulose nitrate, which is dissolved in a suitable low boiling solvent or blend of solvents, is mixed with 20%–80% by weight of the dry cotton, of N-cyclohexyl paratoluenesulfonamide (melting point 86° C.–87° C.). The resulting mixture is applied to a smooth surface and the low boiling solvent is permitted to volatilize slowly. A film so produced will be found to have inordinate water resistance and impermeability to moisture, good light stability, and a degree of hardness without being brittle.

*Example II.*—In lieu of the cyclohexyl paratoluenesulfonamide in Example I substitute 10–70 parts of cyclohexyl paratoluenesulfonamide and 50–10 parts of tricresyl phosphate or butyl glycolyl butyl phthalate. It is to be understood that synthetic or artificial resins, pigments, as well as other modifying agents, may be added and that the method of manipulating the plastic may be varied in a manner well understood to those skilled in the art.

*Example III.*—A cellulose acetate is dissolved in acetone or a blend of solvents and mixed with 20%–40% (by weight of the dry acetate) of N-cyclohexyl paratoluene sulfonamide (86°–87° C.). The resulting mixture is formed into a film in the usual manner, which film will be found to have excellent clarity and toughness. When as much as 100% of the amide is added the film produced is slightly foggy, this being indicative of a separation of the amide from the acetate. While for practically all purposes considerably less of the amide is necessary, this fogginess can often be reduced by supplementing the amide with an additional known plasticizer, such as dimethyl phthalate, etc. The combination of plasticizers produces a striking phenomena which I have not observed in the case of other plasticizers, namely, the mutual improvement. In other words, the resulting film has properties that cannot be accounted for by either one of the materials alone. This is true, when the total quantity of plasticizer is large, as well as small.

What I claim is:

1. A composition of matter, a cellulose ester, containing as a plasticizer for said cellulose ester a mono N-cyclohexyl aromatic sulfonamide in which the aromatic nucleus is of the benzene series.

2. A composition as defined in claim 1 and further characterized in that the aromatic sulfonamide is one of the group consisting of: benzene sulfonamide; toluene sulfonamide; 3,4 dichlorobenzene sulfonamide.

3. The composition as defined in claim 1 and further characterized in that the cellulose ester is one of the group consisting of: cellulose acetate and cellulose nitrate.

LUCAS P. KYRIDES.